Nov. 4, 1947.　　　W. ELSER　　　2,430,219
APPARATUS FOR MAKING CAN BODY SEAMS
Filed April 18, 1944　　2 Sheets-Sheet 1

Inventor
William Elser
By Rule and Hoge,
Attorneys

Nov. 4, 1947.  W. ELSER  2,430,219
APPARATUS FOR MAKING CAN BODY SEAMS
Filed April 18, 1944   2 Sheets-Sheet 2

Inventor
William Elser
By Rule & Hope,
Attorneys

Patented Nov. 4, 1947

2,430,219

UNITED STATES PATENT OFFICE 2,430,219

APPARATUS FOR MAKING CAN BODY SEAMS

William Elser, Toledo, Ohio, assignor, by mesne assignments to Continental Can Company, Inc., New York, N. Y., a corporation of New York Application April 18, 1944, Serial No. 531,538

1 Claim. (Cl. 113—60)

My invention relates to a method and apparatus for making sheet metal bodies of cans or other containers. The invention relates particularly to the formation of the side seams of can bodies and comprises novel heating and cooling means for controlling and regulating the application of heat to the seam portion of the can body during the soldering of the seam and before and after the soldering operation, and for thereafter cooling the metal, all in a manner to effect a uniform heating and cooling of the metal which forms the seam.

In the art of manufacturing sheet metal containers, the general practice throughout the industry is to form the body portion of the container in an automatic body forming machine. The usual procedure involved in the operation of these machines comprises the following operations, namely, bending the longitudinal edges of the body blank to hook form, shaping the body blank over a horn and engaging the hooks, bumping or hammering the hooks together so as to form a continuous longitudinal side seam and thereby maintaining the container body in its formed shape, preheating the outside of the longitudinal seam portion of the body by an external heating means such as gas flames arranged in a row of predetermined length, applying hot molten solder to the said seam by some external means such as a roll revolving in contact with the seam while the roll is partly submerged in a bath of molten solder, wiping off the excess accumulation of solder from the external surface portion of the seam, and cooling the container body by the application of rapidly moving air to the external portion of the seam.

Container bodies when manufactured by the method involving the above operations have certain inherent faults or defects resulting from the method of heating and cooling in which the heating and cooling media are applied only to one surface of the seam, namely, the outer surface or external portion of the seam. The application of heat to the exterior surface of the seam portion of the container, including the preheating, the heat supplied by the molten solder and the post-heating after the solder is applied, results in an outward longitudinal bowing or convexing of the seam. This bowing is due to the uneven heating of the metal seam structure or laminations which expand in direct proportion to the amount of heat absorbed. The outer layers or laminations to which the heat is directly applied, absorb heat much more rapidly than the layers which are more remote from the heating medium, owing to the time element involved in transmitting the heat, resulting in a temporary bowing or flexing of the seam structure in an outward direction or toward the source of heat supply.

By the time the seam structure is uniformly heated throughout, which uniform heating would bring the seam back to the desired straight shape, the container body has passed beyond the preheating, soldering and post-solder heating stations and through the usual wiping operation into the cooling station where the reverse action in the seam structure occurs. That is, the seam is flexed to a concave form. This is caused by the discontinuance of the application of the heat and the substitution of a forced air blast or cooling medium applied to the ouside surface of the seam. This causes a rapid extraction of heat from the outer laminations or portion of the seam structure, causing such outer portion to contract more rapidly than the inner laminations, resulting in a bowing or permanent setting of the structure in a direction opposite to that produced by the application of heat.

The seam or portion of the container body comprising the seam retains this concave or distorted shape when the article is cooled. Such permanent distortion is due to the fact that the solder between the laminations of the seam structure solidifies before the seam structure, during such cooling, has been brought to the uniform temperature required to return it to a staight line position. While cooling is taking place, the laminations of the seam structure nearest to the cooling medium, namely, those adjacent the outer surface of the seam, cool and contract more rapidly than the laminations more remote from said surface, thereby causing a sliding movement of the several laminations relative to each other. When the solder solidifies during such cooling and thereby holds the laminations against further relative or sliding movement, the solder is subjected to a tremendous shearing strain in opposing such further relative movement of the laminations. The placing of the materials under such strain is a serious objection as it tends to produce faulty soldered seams.

A further objectionable feature relating to the bowing of the seams in the manner above described, results from the reduced height or length of the cam body adjacent the seam, such height varying with the depth of the concavity. This reduces the available flanging stock used for seaming of the container ends to the body and results in a faulty double seam.

An object of the present invention is to provide a method and means for overcoming the objectionable features above pointed out. For this purpose the invention provides novel means for uniformly applying heat to the interior surface of the can body along the seam concurrently with the application of heat to the exterior surface so that the heating of the inner and outer laminations is equalized and bowing or distortion is prevented. The invention also provides means for equalizing the cooling action on the inner and outer surfaces of the seam, and thereby prevents stresses and strains being set up during the cooling which follows the soldering operation.

A further object of the present invention, attained by the provision of means for reducing or eliminating bowing and distortion in the manner above described, relates to the increase in the number and variety of solders which are adapted for use in making the can body seams. By preventing distortion of the seams or relative movement of the several plies of metal comprised in the seam, solders having, for example, comparatively low ductility may be used which otherwise would be impractical. The invention makes practical the use of solders which vary through a comparatively wide range in respect to ductility, shearing strength, brittleness, melting and working temperatures, and other properties.

Other objects of the invention will appear hereinafter.

Referring to the accompanying drawings which illustrate a can body forming machine embodying the present invention:

Figure 1:
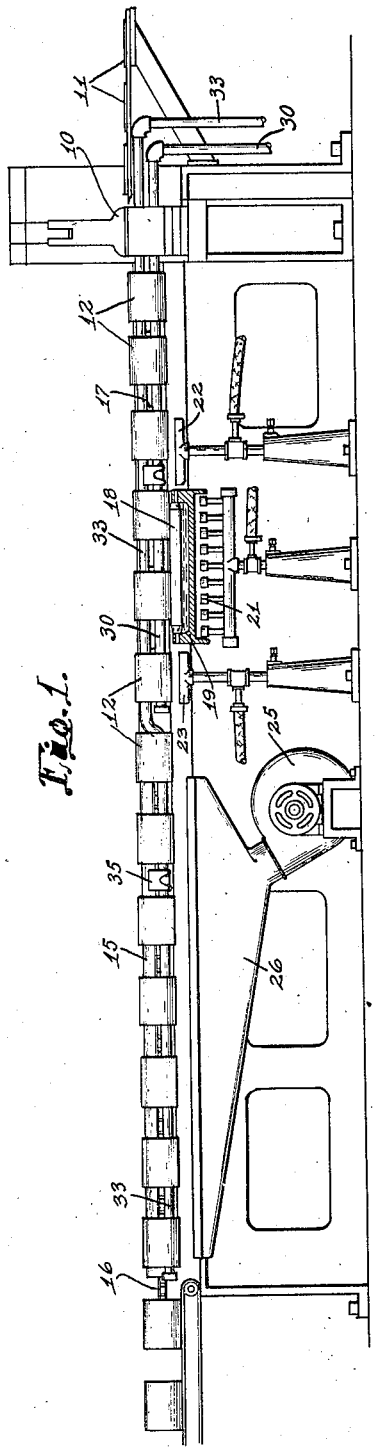
Fig. 1 is a part-sectional side elevation of the machine, certain parts being omitted.
Figure 2:
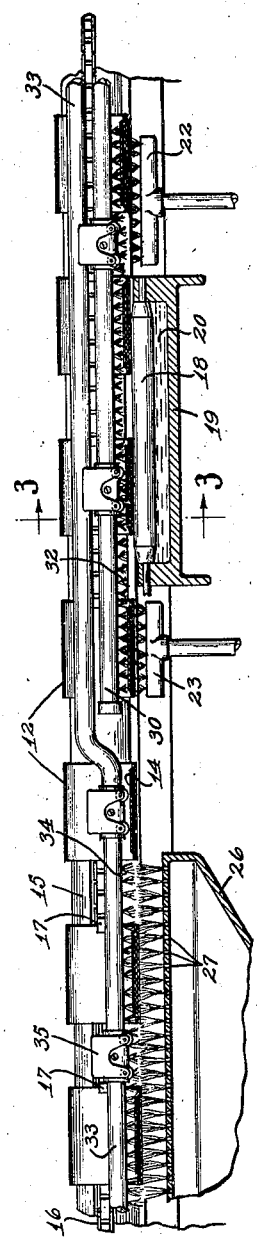
Fig. 2 is a fragmentary sectional elevation on a somewhat larger scale showing particularly the soldering mechanism and the heating, cooling and temperature equalizing means.
Figures 3, 4:
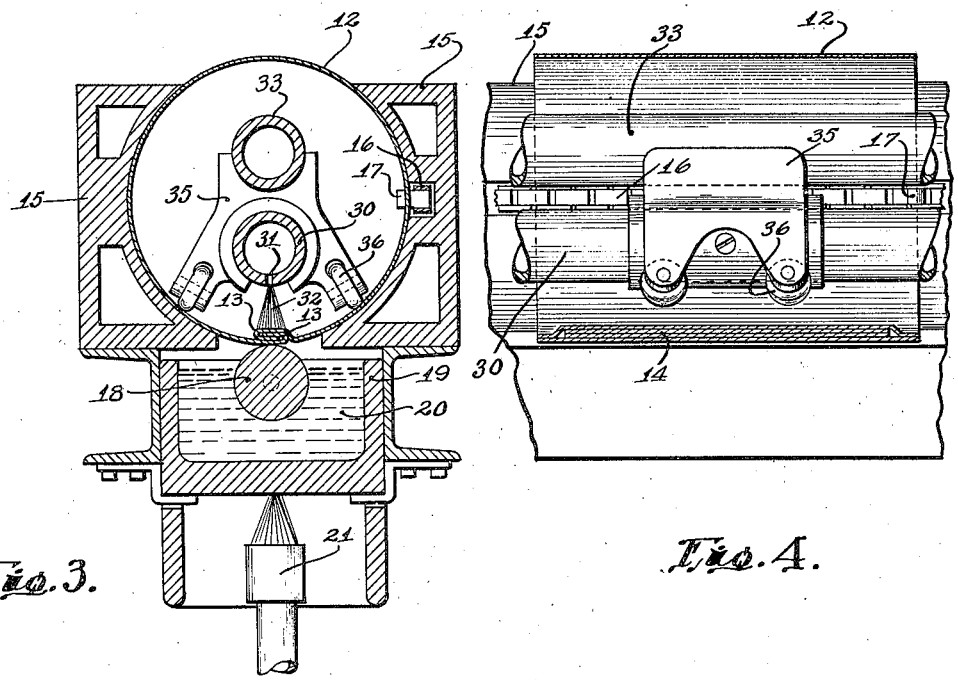
Fig. 3 is a section at the line 3—3 on Fig. 2, on a comparatively large scale.
Fig. 4 is a fragmentary side elevation of certain parts shown in Fig. 3, the can body being shown in longitudinal section.

Referring particularly to Fig. 1, the can body forming machine comprises a body shaping mechanism 10 by which the flat sheet metal blanks 11 are shaped around a horn to form the cylindrical can bodies 12. The opposite edges of the can bodies are bent to form hooks 13 (Fig. 3) which are interengaged and then bumped or pressed together in a conventional manner to form the four-ply side seam 14. The mechanism for thus forming the can body is conventional so that detailed illustration is deemed unnecessary.

The can bodies thus formed are advanced in a continuous row horizontally along the machine and are supported and guided during such advancement by stationary guides 15 which extend lengthwise of the machine in position to embrace the side portions of the advancing can bodies. The can bodies are advanced by means of a traveling chain 16 supported and guided in one of the guides 15 and provided at intervals lengthwise thereof with lugs 17 which project into position to engage the ends of the can bodies.

Means for soldering the side seams 14 includes a solder roll 18 mounted for rotation in a container 19 positioned beneath and extending lengthwise of the path of the can bodies. The roller 18 is partially immerged in a bath of molten solder 20 within the container 19 and is rotated by any suitable means, not shown. A series of burners 21 beneath the container 19 supply the heat required for maintaining the solder at the required temperature.

A preheater 22 comprises a row of burners located beneath the path of the can bodies in position for heating the seam portions thereof before they are brought into contact with the soldering roll. A post-heater 23 positioned at the opposite end of the soldering roll serves to prevent premature cooling of the can bodies. After the can bodies pass beyond the soldering apparatus, they are passed through a cooling zone within which they are subjected to rapidly moving cold air. The cooling air may be supplied by a blower 25 which blows air under pressure into a cold air chamber 26 provided with a row of jet openings 27 beneath and extending lengthwise of the path of the can bodies. The jets of air from the openings 27 are blown directly against the side seams 14 of the can bodies as the latter travel through the cooling zone.

Figure 5:
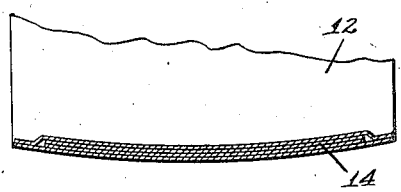
Fig. 5 is a sectional view of the side seam of the can body, showing the seam bowed outwardly by the heat applied to the external surface thereof.
Figure 6:
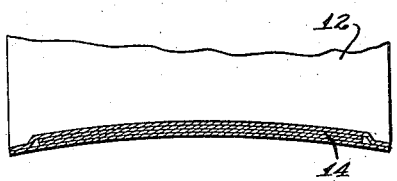
Fig. 6 is a similar view but showing the seam bowed inwardly by the application of cooling air to the exterior surface.
Figure 7:
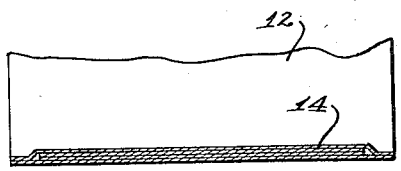
Fig. 7 is a similar view showing a straight seam resulting from a balanced application of heat to the inner and outer surfaces, followed by a balanced application of coolants to said surfaces.

When the seam portions of the can bodies are heated by the application of heat from the heaters 22 and 23 and the hot solder, without the application of localized heat to the inner surface portions, the seams 14 are bowed outward as shown in Fig. 5, in the manner heretofore described. As these bowed seams pass beyond the heating zone into the cooling zone where their exterior surfaces are subjected to the cold air jets, the cooling and contraction of the outer laminations of the seam, more rapidly than the inner laminations, causes the seam to bow inwardly as shown in Fig. 6. The hardening or setting of the solder before the temperature is equalized through the seam and the latter thereby straightened, results in giving the seam a permanent distortion.

In order to counteract the bowing or distortion caused by one-sided heating and cooling of the seams, the present invention provides means for applying heating and cooling media to the inner surfaces of the seam as will now be described. A burner pipe 30 extends from the right-hand end of the machine lengthwise of the path of travel of the can bodies and in the direction of said travel, in position to be surrounded by said can bodies. Fuel gas is supplied to the pipe 30, and the latter is formed with a row of jet openings 31 (Fig. 3) extending through the lower wall of the pipe for supplying jets of flame 32 which are projected downwardly against the seam 14. These jets of flame are directly opposite the soldering roll 18 and the preheating and post-heating burners 22 and 23. The row of jets 32 is substantially coextensive lengthwise of the machine with the external heating media comprising the heaters 22, 23 and soldering roll 18. The construction and arrangement is such that heat is applied to the surface of the seam 14 on the interior of the can body simultaneously with the application of heat to the exterior surface of the seam, the amount of heat applied to the interior surface being substantially equal to that applied to the exterior surface. As a result the inner and outer laminations of the seam are simultaneously heated and expanded at substantially the same rate and at the same time so that the seam remains straight and free from distortion throughout the heating and soldering operations.

A cooling pipe 33 extends forwardly from the right-hand end of the machine parallel with the pipe 30 along the path of the can bodies, and is extended beyond the pipe 30 through the cooling zone. Cold air under pressure is supplied through the pipe 33 to jet openings extending through the bottom wall of the pipe for projecting a row of jets 34 of cooling air against the inner surfaces of the seams 14. The cooling jets 34 are directly opposite the jets from the cooling chamber 26 so that the inner and outer surfaces of the seams are subjected to substantially equal cooling influences while passing through the cooling zone, whereby unequal cooling and distortion of the seams is prevented. The pipes 30 and 33 are supported by means of yoke-shaped brackets or supporting members 35 in which the pipes are mounted, said supporting members being spaced at intervals along the pipes. Rolls 36 journaled in the supporting members 35 run on the interior surfaces of the can bodies, permitting free movement of the latter through the machine.

Although I have shown a gas burner pipe supplying a row of jets of flame 32 for applying heat to the inner surface of the seams, it will be understood that other means for supplying localized heat to counterbalance the externally applied heat, may be employed. Likewise, other methods and means for applying a localized cooling medium to the inner surfaces of the seams as they advance through the cooling zone, might be used within the scope of the present invention.

Modifications other than those above mentioned may be resorted to within the spirit and scope of my invention.

I claim:

A machine for soldering the side seams of can bodies comprising a solder bath, a solder applying roll associated therewith, means for supporting and feeding can bodies along the solder applying roll with the outer face of the side seam in contact with the solder, a pre-heating means disposed beneath the path of travel of the can bodies and over which the side seams of the can bodies pass to the solder applying roll and a heater disposed within the can bodies and coextensive with the pre-heating means and the solder applying roll, said heater including heating jets directed against the inner face of the side seam, the capacity of said heater being such that the amount of heat applied to the interior surface of the side seam is substantially equal to that applied to the exterior surface thereof by the pre-heating means and the solder roll, thereby preventing distortion of the side seam by the uneven heating of the inner and outer parts thereof.

WILLIAM ELSER.

REFERENCES CITED

The following references are of record in the file of this patent:

UNITED STATES PATENTS

| Number | Name | Date |
|---|---|---|
| 741,620 | Brooks | Oct. 20, 1903 |
| 1,123,081 | Bowser | Dec. 29, 1914 |
| 2,193,955 | Weisenburg | Mar. 19, 1940 |
| 1,666,707 | Kronquest | Apr. 17, 1928 |
| 1,050,956 | Kruse | Jan. 21, 1913 |
| 1,542,664 | Brenzinger | June 16, 1925 |
| 653,467 | Brooks | July 10, 1900 |
| 832,301 | Eldridge | Oct. 2, 1906 |
| 577,457 | Solter | Feb. 23, 1897 |
| 1,974,641 | Burns | Sept. 25, 1934 |
| 518,375 | Ranney | Apr. 17, 1894 |
| 1,799,465 | Holloway | Apr. 7, 1931 |
| 2,054,086 | Jones | Sept. 15, 1936 |
| 576,121 | Hume | Feb. 2, 1897 |

FOREIGN PATENTS

| Number | Country | Date |
|---|---|---|
| 467,173 | France | June 5, 1914 |